July 28, 1942.  R. P. HEUER  2,290,961
DESULPHURIZING APPARATUS
Filed Nov. 15, 1939   4 Sheets-Sheet 1
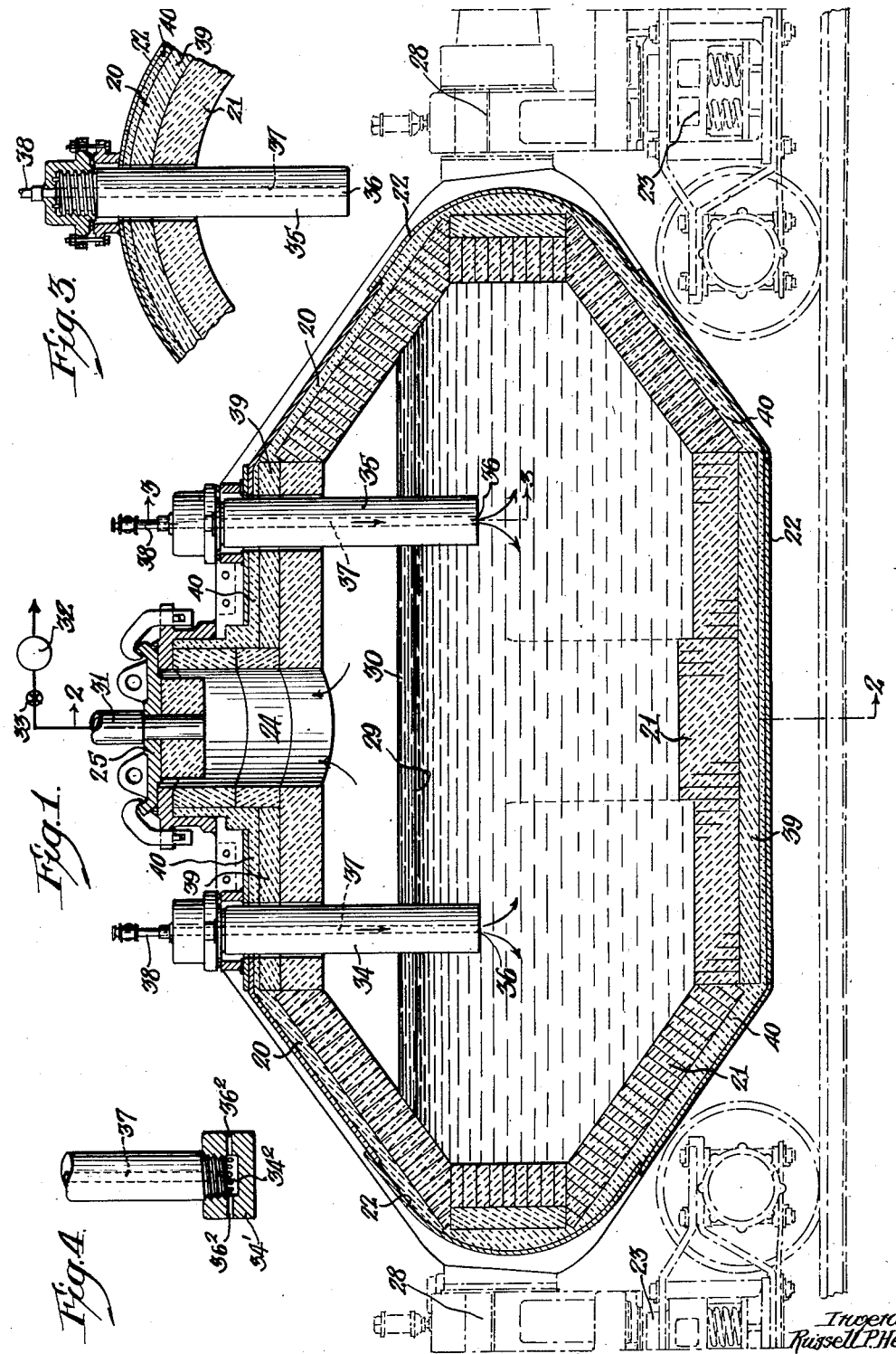

July 28, 1942. R. P. HEUER 2,290,961
DESULPHURIZING APPARATUS
Filed Nov. 15, 1939 4 Sheets-Sheet 2
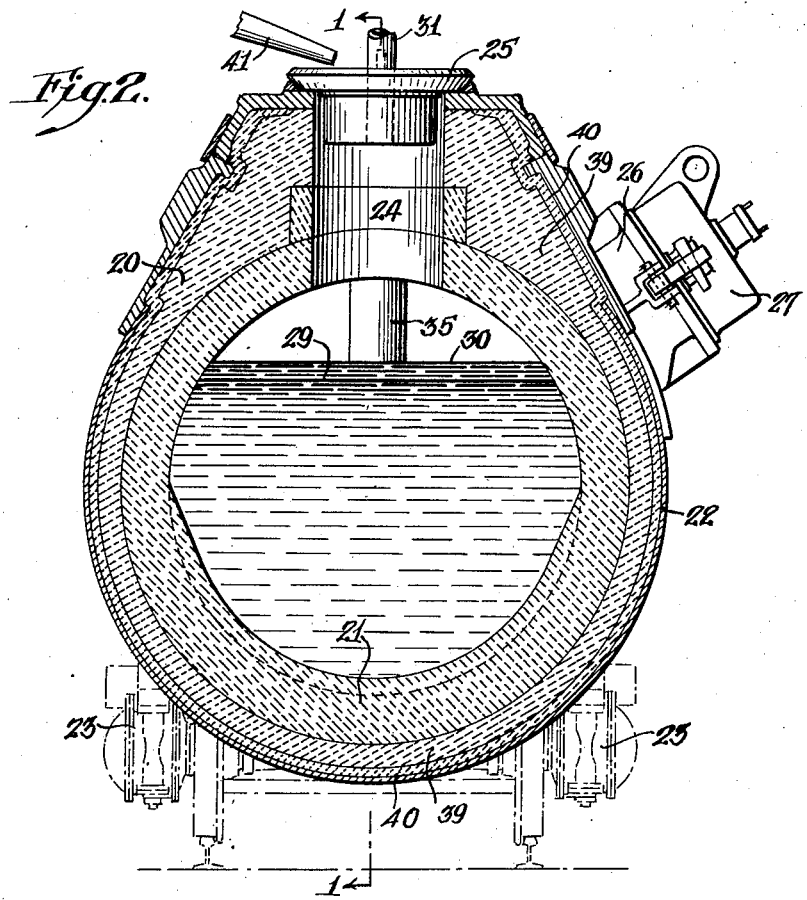
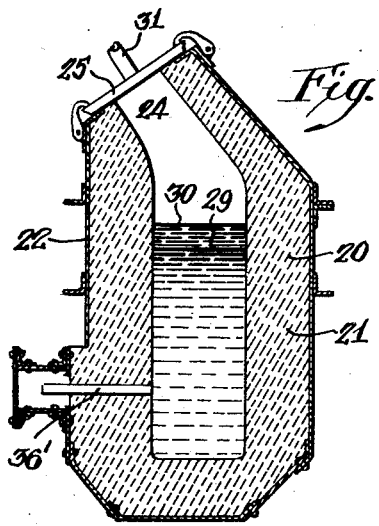
Inventor:
Russell P. Heuer
by [signature]
Attorneys.

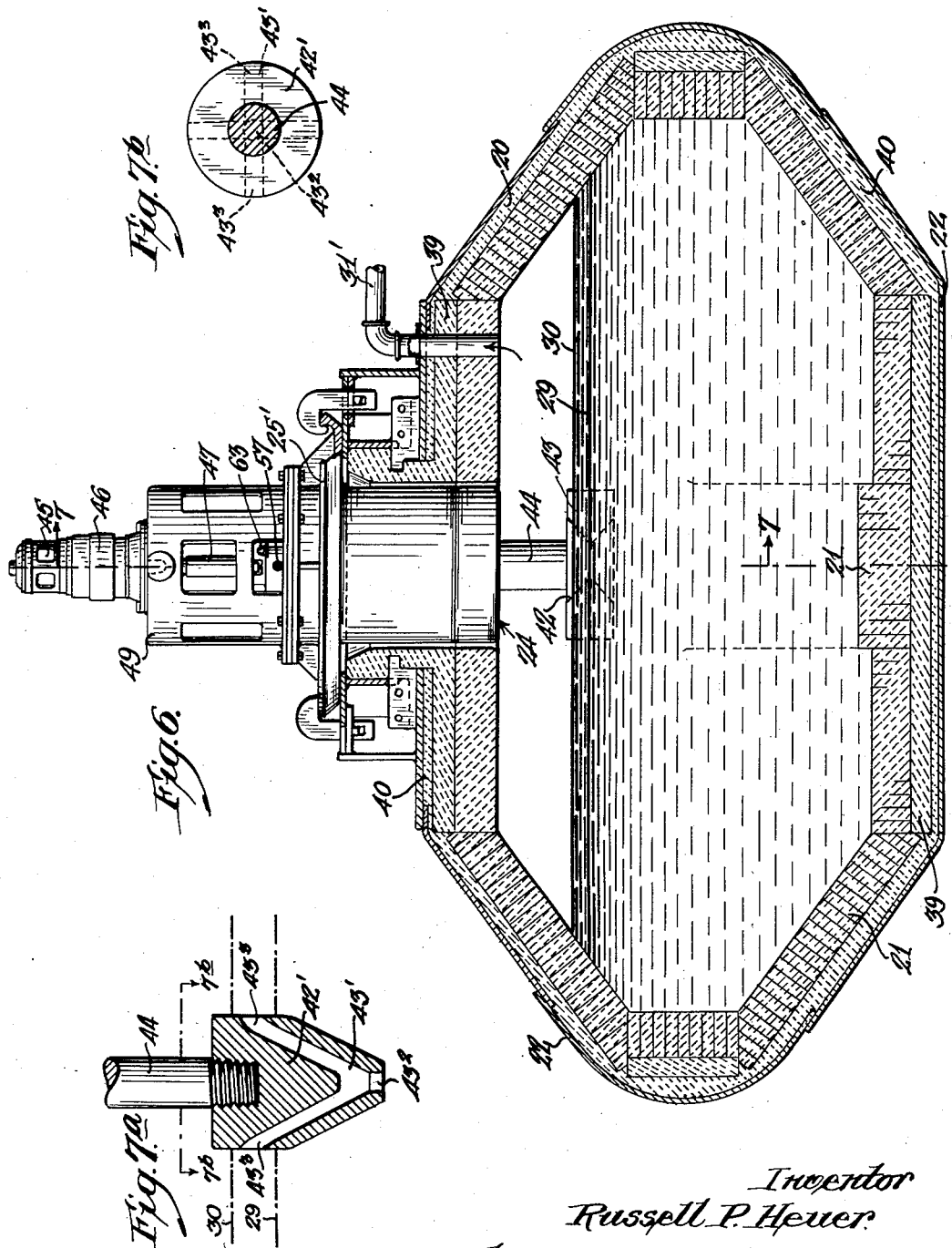

July 28, 1942.  R. P. HEUER  2,290,961
DESULPHURIZING APPARATUS
Filed Nov. 15, 1939  4 Sheets-Sheet 4
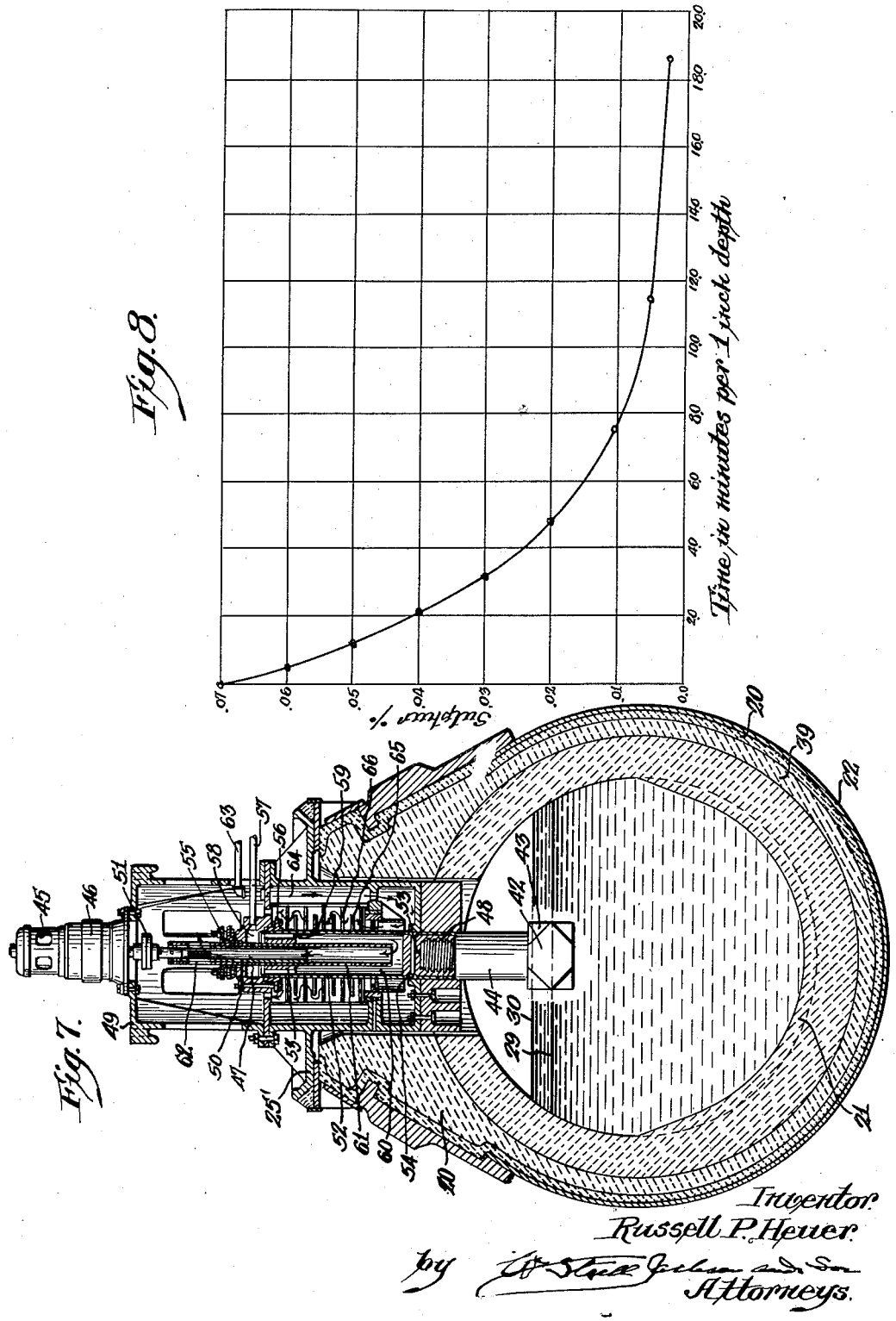
Inventor
Russell P. Heuer
by ... Attorneys.

Patented July 28, 1942

2,290,961

UNITED STATES PATENT OFFICE 2,290,961

DESULPHURIZING APPARATUS

Russell P. Heuer, Villa Nova, Pa., assignor to Essex Research Corporation, Wilmington, Del., a corporation of Delaware Application November 15, 1939, Serial No. 304,484

6 Claims. (Cl. 13—23)

My invention relates to apparatus for the manufacture of pig iron and the production of steel and principally to the desulphurization of pig iron. This application is a continuation in part of my copending application which resulted in Patent No. 2,193,593, granted March 12, 1940, for Iron desulphurization.

A purpose of the invention is to operate a coke blast furnace to produce pig iron higher in sulphur than that ultimately desired, and preferably at a lower cost than normal, by operating the blast furnace at a lower temperature and/or with less basic slag and/or with low grade raw materials causing higher sulphur in the charge, and to provide improved apparatus in which to treat the molten pig iron thus produced with a basic slag external to the blast furnace hearth, to remove the excess sulphur from the molten pig iron. The pig iron thus produced may be used in the form of cast iron or as raw material for making steel.

A further purpose is to expedite the desulphurizing reaction between a basic desulphurizing slag and molten pig iron by producing local agitation adjacent the slag-pig iron interface, and preferably by projecting streams of molten pig iron into the slag.

A further purpose is to agitate molten pig iron during desulphurization under the action of a basic slag, by introducing beneath the surface of the slag and pig iron, a stream of noncontaminating gas, suitably nitrogen, carbon monoxide, producer gas, or coke oven gas, at a pressure substantially above that at the surface of the pig iron and at a temperature substantially below that of the molten pig iron, and desirably also to maintain subatmospheric pressure above the surface of the molten pig iron so as to cause the gas to do a maximum of work upon the pig iron. The gas will desirably be at a pressure at least as great as atmospheric pressure and at about room temperature.

A further purpose is to desulphurize pig iron in a closed vessel maintained under subatmospheric pressure and to introduce a noncontaminating gas through tuyères below the surface of the molten metal, the gas being caused to increase its volume greatly during its upward flow through the molten metal by reason of reduction in pressure and increase in temperature, either or both, thereby violently agitating the molten metal and projecting streams of molten metal upwardly into the slag at the slag-pig iron interface.

A further purpose is to introduce a stream of agitating gas beneath the surface of molten pig iron being desulphurized by a basic slag, the gas being at a high enough pressure or low enough temperature, either or both, to undergo rapid expansion while flowing up through the metal, and to concurrently evacuate the vessel, removing gas at a rate at least as great as that at which gas is supplied so as to maintain subatmospheric pressure in the vessel. The reduced pressure then performs a dual function; it chemically intensifies the desulphurization and it physically accelerates the agitation.

A further purpose is to electrically heat a desulphurizing vessel and to locate gas tuyères in one or more electrodes.

A further purpose is to mechanically agitate a bath of molten pig iron undergoing desulphurization, preferably by a rotary impeller desirably acting horizontally and locally at the slag-pig iron interface.

A further purpose is to cool the drive shaft of a rotary impeller for agitating molten pig iron by fluid circulation, preferably against fins on the drive shaft.

A further purpose is to pump molten metal into contact with desulphurizing slag during the desulphurizing treatment in accordance with the invention.

A further purpose is to avoid cutting of the lining or tuyère of a desulphurizing vessel due to flow of agitated metal or slag in contact with the lining or tuyère by constructing the refractory lining or tuyère of an insoluble refractory, suitably carbon.

Further purposes appear in the specification and in the claims.

The invention relates to the apparatus for agitating.

The present application incorporates by reference my United States patent applications, Serial No. 20,555, filed May 9, 1935, for Iron and steel desulphurization, Patent No. 2,110,066, granted March 1, 1938; Serial No. 96,743, filed August 19, 1936, for Iron desulphurization, Patent No. 2,110,067, granted March 1, 1938; Serial No. 171,-

800, filed October 29, 1937, for Desulphurizing apparatus, Patent No. 2,177,716, granted October 31, 1939; and Serial No. 123,423, filed February 1, 1937, Patent No. 2,193,593, granted March 12, 1940, for Iron desulphurization, with the purpose and intent that subjects matter may be transferred from any of these applications to the present application as required. Reference should be had to these patents and this application for further disclosure of the process.

In the drawings no attempt has been made to illustrate all of the possible embodiments of the invention. The forms shown have been chosen from the standpoints of satisfactory operation and convenient illustration of the principles involved.

Figure 1 is a diagrammatic central vertical section of a desulphurizing vessel in accordance with the present invention. In respect to certain structure not important to the invention, such as the car trucks, this figure is fragmentary.

Figure 2 is a section of Figure 1 on the line 2—2.

Figure 3 is a section of Figure 1 on the line 3—3.

Figure 4 is a fragmentary central vertical section of a modification of the tuyère of Figure 1.

Figure 5 is a central transverse section of a variant desulphurizing vessel according to the invention.

Figure 6 is a central longitudinal section, largely diagrammatic, of a further variation in the construction of the desulphurizing vessel, omitting the car trucks and supporting structure.

Figure 7 is a section of Figure 6 on the line 7—7.

Figure 7a is a central vertical section of a modification of the impeller of Figures 6 and 7.

Figure 7b is a section of Figure 7a on the line 7b—7b.

Figure 8 is a curve showing the rate of sulphur removal from pig iron under special controlled conditions.

In the drawings like numerals refer to like parts, and in the specification like symbols refer to like subjects matter.

Throughout the specification, wherever reference is made to pig iron, it is intended to designate the product of the blast furnace which characteristically has a high carbon content, usually of 3% to 4%, or more, and always in excess of 2%, with varying contents of metalloids. The product of the blast furnace is referred to as pig iron whether it is intended to be used in the form of cast iron or whether it is to be used in making steel.

In the production of pig iron from low-sulphur burdens (such as wood charcoal and low sulphur ores) it is unnecessary to operate the blast furnace in such a manner as to obtain strong desulphurizing conditions in the hearth and bosh of the blast furnace. As a result the operation of the charcoal blast furnace is quite economical except for the excessive costs of charcoal and of low sulphur ores. In most instances, however, because of the high cost of wood charcoal, it is necessary to substitute coke for wood charcoal as a blast furnace fuel. When this is done, a strong desulphurizing action must be obtained in the hearth and bosh of the blast furnace in order to obtain a product having low enough sulphur to be commercially usable. For a strong desulphurizing action, it is necessary to have a higher temperature and a slag containing more lime than for a weaker desulphurization. More fuel must be used in order to provide the higher temperature.

A typical slag from a charcoal blast furnace approximates

| | Percent |
|---|---|
| $SiO_2$ | 47.0 |
| $Al_2O_3$ | 18.0 |
| $CaO$ | 27.0 |
| $MgO$ | 3.0 |
| $S$ | 0.10 |

In the above slag the silica exceeds the lime plus magnesia. The sulphur in the pig iron approximates 0.02%.

A typical slag from a coke blast furnace has the following approximate composition:

| | Percent |
|---|---|
| $SiO_2$ | 34.0 |
| $Al_2O_3$ | 12.0 |
| $CaO$ | 40.0 |
| $MgO$ | 10.0 |
| $S$ | 1.7 |

In the above slag the silica is less than the lime plus magnesia. The sulphur in the pig iron approximates 0.03%.

The temperatures of the slag and pig iron tapped from a charcoal blast furnace are about 1450° C. and 1410° C. respectively. In the coke blast furnace, the respective temperatures of the slag and pig iron as tapped are approximately 1525° C. and 1475° C. Thus it is unnecessary for the charcoal blast furnace to expend as much heat to produce slag and pig iron as does the coke blast furnace.

From the above data it will be obvious that the cost of removing sulphur from the pig iron simultaneously with smelting of the ore in a blast furnace is considerable. It is one purpose of the present invention to cheapen the cost of manufacturing pig iron, whether for use as cast iron or for making steel, by omitting the strong desulphurizing action now considered necessary in the coke blast furnace because of the sulphur-bearing burdens. The smelting is conducted in the coke blast furnace under conditions of temperature and basicity of slag suitable to produce pig iron at lower cost but with a higher sulphur content in the iron than that ultimately desired. The sulphur content in the iron produced may be for example 0.25% sulphur. After production of this high sulphur pig iron by the invention, it is treated in novel apparatus as a wholly independent operation to remove the excess of sulphur. The cost of the desulphurization is small and it is possible to produce pig iron of desirable quality at a considerable saving. Of course it is not necessary that the high sulphur pig iron contain as much as 0.25% sulphur before treatment. The process is equally adapted to the desulphurization of pig iron containing 0.10% sulphur or 0.05% sulphur or less depending upon individual conditions.

The pig iron, containing a higher sulphur content than that ultimately desired, is transferred from the coke blast furnace to a suitable desulphurizing vessel as described later. The pig iron is there subjected to a strongly basic slag under reducing conditions.

The desulphurizing slag contains basic oxides of the alkaline earth or alkali metals such as calcium oxide, barium oxide, strontium oxide, sodium oxide, etc. These are referred to generically as $R_xO$ oxides, where R is an alkaline earth or alkali metal and $x$ is the numeral 2 or 1, depending upon the valence of the metal. The oxides of the slag tend to react with sulphur of the pig iron thus:

$$R_xO \rightleftharpoons xR + \tfrac{1}{2}O_2 \tag{1}$$

$$xR + \tfrac{1}{2}S_2 \rightleftharpoons R_xS \tag{2}$$

From reactions 1 and 2 it will be evident that there will be a low activity of sulphur and sulphur can be removed from the pig iron to enter the slag most efficiently if there is a low oxygen activity. In other words, the sulphur activity may be lowered directly by lowering the oxygen activity. The desulphurizing slag is therefore caused to act upon the pig iron in the presence of a deoxidizing agent, as for example an excess of carbon preferably under diminished pressure, or in the presence of carbon compounds such as calcium carbide or metallic reducing agents such as manganese, silicon, aluminum, calcium, magnesium or the like.

The pig iron desulphurized by the present invention will in most cases be pig iron produced in the coke blast furnace when operated under conditions of moderate temperature and moderate basicity of the slag suitable to produce pig iron of lower cost but with a higher sulphur content than that ultimately desired. Ore of low iron content and coke or ore of high sulphur content may be used. The sulphur content of the pig iron produced in the coke blast furnace under such economical conditions may be 0.25%, 0.3% or even higher. Of course the invention may also be applied to pig iron of normal sulphur content, containing, say 0.04% S.

The pig iron to be desulphurized is brought into contact with a desulphurizing slag under the proper conditions. For example the desulphurizing slag can first be charged into a ladle or other vessel and the molten iron can then be added. If the desulphurizing slag is to contain blast furnace slag, as explained below, such blast furnace slag can be added molten from the blast furnace if desired. Lime and fluorspar may be added to the molten blast furnace slag and the entire mixture made molten by additional heat before the iron is charged, if desired. If preferred, the lime and fluorspar can be added in solid form to the desulphurizing vessel either before, during or after the addition of the iron.

It has been discovered that agitation of the desulphurizing slag and molten pig iron is necessary in order to cause the desulphurizing reaction to proceed with convenient speed. The present inventor has performed experiments without agitating the molten slag and molten pig iron. Figure 8 shows the rate of sulphur removal under certain fixed conditions, using a slag consisting of 40% blast furnace slag, 30% fluorspar and 30% burnt lime, without agitation. In this figure the molten pig iron contained 0.07% sulphur at the beginning of the experiment. This iron was treated with desulphurizing slag of the composition just noted under deoxidizing conditions and freedom from air contamination, and samples of iron were withdrawn for chemical analysis at specified times. In Figure 8 the experimental data have been plotted in a curve showing, as the ordinate, the percentage of sulphur present in the iron, and, as the abscissa, the elapsed time for the reaction expressed in minutes per inch of depth of the metal bath.

The rate of sulphur removal is proportional to the depth of molten metal. From the curve it will be seen that, in order to lower the sulphur content from 0.07% to 0.005%, approximately 12 minutes are required for each one inch of depth of metal bath. In a customary pig iron ladle a depth of metal of 60 inches or more is to be expected. Thus for a depth of 60 inches, an elapsed time of 720 minutes or 12 hours would be required to desulphurize to the above extent. This time is too long for most operating conditions.

The rate of reaction can be speeded up appreciably by agitating the molten metal and/or the slag. The present invention is concerned particularly with such agitation and particularly with agitation at the slag-metal interface. It has been discovered that very efficient reaction is obtained by agitation which projects molten metal into the slag and which, in a sense, breaks up the smoothness of the slag-metal interface, particularly by introducing metal from within the body of the bath not recently in contact with the slag. This is much more effective than the older methods of agitating the liquid contents of the desulphurizing material bodily, through shifting of the vessel or otherwise.

A particularly efficient method of agitation is by introducing a stream of agitating gas beneath the surface of the slag and/or the pig iron. The gas may be any suitable noncontaminating gas such as nitrogen, carbon monoxide, producer gas, or coke oven gas. Except for expense, the inert rare gases such as argon, neon, zenon or krypton might be used. For best results the gas should not be oxidizing. Oxidizing concentrations of air, carbon dioxide, and water vapor should desirably be avoided in the agitating gas.

In experiments made with nitrogen introduced at a rate of one cubic foot per minute (measured at the prevailing temperature and pressure of the iron) per square foot of metal surface, the sulphur content of a charge was lowered from 0.09% to 0.004% in four minutes for each one inch depth of pig iron in the bath. Under these conditions a 60-inch depth of pig iron would be desulphurized with a 0.004% sulphur content in four hours, which is a commercially feasible time.

The gas should be introduced considerably below the surface of the molten iron. By so doing the gas bubbles rise rapidly in the iron and create an upwardly flowing stream of molten iron which is projected into the slag at the slag-pig iron interface. There is thus a definite vertical circulation in the iron adjacent the gas stream.

Agitation by introducing gas below the surface of the bath is very much more efficient where the pressure above the surface of the bath is substantially below atmospheric pressure. When gas at a temperature substantially lower than that of the pig iron is introduced into the pig iron, there is, of course, rapid expansion of the gas due to rise in temperature. If, however, the gas is at substantially greater pressure than the pressure on the pig iron, expansion occurs also because of the pressure differential, and this condition is accentuated by subatmospheric pressure maintained on the iron.

Under the high temperatures prevailing and with a subatmospheric pressure of, for example, 0.1 atmosphere absolute, it requires but a very small amount of gas at normal pressure and temperature to produce one cubic foot of gas under the conditions in the desulphurizing vessel, since each cubic foot at normal pressure and temperature is multiplied about ten times because of the diminished pressure and about six times more because of the increased temperature. Thus one cubic foot under atmospheric conditions will become about 60 cubic feet of gas for agitation purposes.

Much of the agitation produced by the rising column of gas is due to work done by the expanding gas as it passes through the molten iron. My calculations indicate that for a pressure in the desulphurizing vessel of 0.1 atmosphere absolute, each cubic foot of gas (measured at normal pressure and temperature) is capable of doing work on the molten iron at a rate of 0.86 horsepower. In a ladle containing one hundred tons of molten iron, it is possible to use twenty cubic feet of gas at normal temperature and pressure, or more, per minute for agitation. Such an amount of gas produces a stirring in the molten iron equivalent to more than 17 horsepower.

It will be evident that the agitation obtained by any amount of gas is greatly increased because of the diminished pressure. It will also be greatly increased due to the high temperature of the molten iron. It is important that the weight of gas which passes through the iron be kept down to a reasonable minimum so that the amount of heat absorbed by the gas from the molten iron is not excessive, and also so that a vacuum pump or similar apparatus of moderate size will be capable of maintaining the reduced pressure.

Since the gas in doing work against the molten iron by expanding into the vacuum maintained above the surface of the molten iron does work on the iron at constant temperature, an amount of heat is absorbed from the iron equivalent to the amount of work done on the iron by the gas. The amount of work done by the gas is imparted to the iron in the form of the energy which accomplishes agitation. This energy is eventually lost by the iron due to friction of the moving iron masses, which in turn generates an amount of heat equal to the work originally done by the gas. Thus the gas absorbs heat from the iron and converts it into work which is imparted to the iron. This work is eventually converted back into heat and the entire cycle takes place without loss of heat by the iron other than the sensible heat which escapes when the gas is removed from the desulphurizing vessel.

The reduced pressure not only accentuates the stirring action, but it also intensifies the desulphurization reaction, thus performing two functions aiding in the result.

In the form of Figures 1 to 3 inclusive, the desulphurizing vessel 20, suitably of ladle car type, consists of a refractory lining 21 and a metallic structural shell 22. While the invention may be embodied in a stationary device such as a stationary ladle, mixer or furnace, it is contemplated that the desulphurizing vessel 20 will ordinarily be a transfer ladle, and suitable railway trucks 23 are illustrated.

The desulphurizing vessel is provided with a charging opening 24 closed by a suitable removable gas-tight closure 25, the detail of which is not here important. A pouring spout 26 is provided with a suitable removable closure 27 and the desulphurizing vessel is rotatable on trunnions 28 to permit pouring.

The level of molten pig iron is shown at 29 and on top of the molten pig iron rests a basic desulphurizing slag 30, which may be any of the slags referred to below.

The space above the slag and metal in the preferred embodiment is maintained at subatmospheric pressure, desirably at a pressure below 380 millimeters of mercury, preferably at a pressure below 150 millimeters of mercury and most desirably at a pressure below 76 millimeters of mercury. Where the slag will stand such low pressure, a pressure of 30 millimeters of mercury may be employed with success.

A piping connection is shown at 31 to a suitable source of vacuum 32 such as a vacuum pump or a condenser and ejector. Valve means to control the vacuum is illustrated at 33.

In many cases it is not necessary to supply additional heat to the molten pig iron during treatment. Where heating is desired, electric resistance heating is obtained by passing current through the bath between electrodes 34 and 35 suitably of carbon. The detail of insulation of the electrodes from the metallic structural parts is not critical in the present invention and will not be amplified.

Tuyères 36 are provided, one in each electrode. The electrodes are desirably interiorly bored as shown at 37 and the bores communicate with connections 38 from a source of suitable gas as above described, preferably under a pressure above atmospheric pressure and at approximately room temperature.

The number of tuyères is not critical and, depending upon the operation conditions, any suitable number may be employed. In the installation of Figures 1 to 3 one tuyère at a time or both tuyères may be used. It is important that the tuyères introduce the gas below the slag-metal interface 29, and preferably a substantial distance below so that a powerful upwardly flowing stream of molten metal may be created. The particular angle at which the tuyères are disposed is not, however, critical, and the tuyères may, for example, be directed inwardly from the side near the bottom as shown at 36' in Figure 5 after the manner of tuyères in side blown copper converters or in Bessemer converters.

The character of the refractory lining 21 is a matter of considerable importance.

In experiments made by me, it was found that fire clay brick were fairly resistant to slag attack from a slag consisting of 60 parts by weight of blast furnace slag, 20 parts of fluorspar, and 20 parts of burnt lime, if no agitation was employed. Where, however, strong agitation is used, as in the present invention, I have found that fire clay bricks are destroyed in an amazingly short time. In one experiment using a tuyère composed of a heavy steel tube protected by a sleeve of fire clay two inches thick, it was found that the fire clay sleeves were completely destroyed in from five to ten minutes.

The explanation of this behavior appears to be that fire clay is slightly soluble in the basic desulphurizing slag. Where no agitation is used, a fire clay brick, although slightly attacked at its surface, forms with the desulphurizing slag at the point attacked a very viscous silicate slag which, in the absence of agitation, has high enough viscosity to remain in place and protect the remainder of the brick from rapid attack. Where, however, agitation is present, the viscous slag is removed from the surface of the fire clay refractory and the remaining brick is dissolved away, with remarkable rapidity, as just noted.

It is, therefore, very important to use a refractory which is insoluble in the slag and the molten pig iron where agitation is employed. Carbon, preferably graphite, is recommended for the refractory lining and also for the tuyères. Carbon is insoluble in the slag and also insoluble in the iron, since the iron is already of high carbon content. It is vastly superior to a slightly soluble refractory such as magnesia or fire clay. The refractory lining 21 will suitably be backed up by clay brick 39 and the clay brick will preferably be surrounded by a heat-insulating layer of ganister clay 40.

In some instances it is preferable to have multiple tuyères operating from a single electrode. In Figure 4 an electrode head 34' is provided with numerous radial tuyères 36², all communicating with the central bore 37. This has the advantage of providing much wider distribution of gas flow through the cross section of the bath than that secured in the form of Figures 1 to 3 inclusive. The tuyère head 34' will suitably be of carbon and attached to the electrode in any suitable manner, as by threads 34².

An illustrative cycle of operations is as follows. The ladle car containing about 2.5 tons of molten desulphurizing slag, preferably slag which has previously been used to desulphurize a previous charge of molten pig iron, is filled with about 100 tons of molten pig iron from the coke blast furnace flowing through the blast furnace runner 41, and containing as much as about 0.3% sulphur or more (say 0.26% sulphur). The molten slag is held in contact with the molten iron under the proper diminished pressure and with the proper flow of gas for as much as one hour or more until the sulphur content of the molten pig iron has fallen to between about 0.03% sulphur and 0.10% sulphur (say 0.05% sulphur) and the sulphur in the slag has increased to perhaps 5% sulphur or a much higher figure (say 10.8% sulphur). With good operating conditions and efficient slags, as much as 12% sulphur can be built up in the slag with only 0.04% or 0.05% sulphur in the pig iron. It is desirable to have a high concentration of sulphur in the slag when the slag is to be revivified since the amount of slag necessary is thereby reduced.

At this stage the slag is then removed from the ladle car by the pouring spout 26.

In the preferred process about 2.5 tons of a second slag similar in composition to the first slag are now added, and further desulphurization of the molten pig iron is accomplished.

The pig iron and slag are maintained in contact with one another preferably for an additional hour or more under the proper diminished pressure and with the proper flow of gas, and the sulphur content of the pig iron may thereby be reduced to 0.015% sulphur, 0.01% sulphur or even less if desired. The sulphur content of the second slag may increase from a negligible quantity at the time it is charged to 1% sulphur or 2% sulphur or more. The molten iron is then separated from the second slag, as by tapping the second slag, then removing the molten iron, and then pouring back the second slag into the ladle car, or by retaining the molten slag in the ladle car during tapping of the iron, for example by submerging the pouring opening below the slag level before removing the plug from the pouring opening and then retaining the slag level above the pouring opening during pouring from the ladle car.

The ladle car is then returned to a source of high sulphur pig iron to receive a further charge of say 100 tons, and the further charge is desulphurized by a first treatment with the slag which was used as the second slag on the previous charge, by removal of the high sulphur slag produced thereby, by addition of fresh slag and so on.

Mechanical impellers have been used with considerable success to secure intimate mixing of the molten slag and iron. It has been found to be preferable to place the impeller adjacent the slag-iron interface and preferably to rotate the impeller horizontally at the interface. Agitation of this character produces rates of desulphurization comparable with the results given by gas agitation. The choice of whether gas agitation or mechanical agitation will be used will depend upon the particular conditions prevailing. Where vacuum is to be employed or where it is preferred to avoid the expense of maintenance of moving parts operating at high temperatures, gas agitation is distinctly to be preferred.

Figures 6 and 7 illustrate a desulphurizing vessel which will desirably be similar to the form of Figures 1 to 3 inclusive as to its general construction. The charging opening 24 is closed by a removable gas-tight closure 25' which carries an impeller 42 having suitable blade or facet surfaces 43. The impeller is supported on a preferably integral impeller supporting extension 44. The impeller will desirably be of carbon refractory and will rotate in a horizontal plane on a vertical axis. The location of the impeller at the slag-iron interface 29 as shown is very desirable as it insures agitation at this important point, with extension of agitation for a substantial distance into the bath.

The impeller 42 is driven preferably by a self-contained driving unit consisting of an electric motor 45 and speed reduction mechanism 46 connected to a composite vertical shaft 47 which is suitably united, as by threads at 48, to the impeller-supporting extension 44. The motor and speed reducer are supported on a windowed housing 49. The motor 45 will preferably be a variable speed direct current motor which produces an impeller speed ranging from 50 to 100 revolutions per minute. The speed will of course vary with the installation.

The upper unit of the shaft 47 is a tubular shaft 50 coupled to the speed reducer 46 at 51. The lower unit of the shaft is a larger tubular shaft 52 interconnected with the tubular shaft 50 by a longitudinally ported collar 53. At the lower end of the larger tubular shaft 52, a connector 53, which actually engages the impeller, is supported by a pin 54. The shaft 47 is supported and guided by suitable bearing surfaces 55 and 56.

Suitable fluid cooling means for the metallic parts of the shaft are provided. The medium will preferably be circulating air. Inlet 57 connects with space 58, longitudinal ports 59 and space 60 between the larger shaft 52 and an extension 61 from the smaller shaft 50. The air in this circuit next flows through the interior of extension 61 and shaft 50 and out into the atmosphere through ports 62 and the windows of the housing 49. In the other circuit, air flows from inlet 63 and space 64, through a labyrinth consisting of fins 65 on larger shaft 52 and stationary deflecting vanes 66, and then through ports 67 and the windows of housing 49 to the atmosphere.

The impeller and its operating mechanism are removable as a unit for the purpose of charging the desulphurizing vessel.

In the form of Figures 6 and 7 the vacuum is maintained through a piping connection 31' which extends to the vacuum source 32 (Figure 1), not shown in Figure 6.

The impeller 42 as shown in Figures 6 and 7 may be modified as shown in Figures 7a and 7b by employing a vertical lift or pumping impeller 42' instead of the blade type impeller 42. The pumping impeller 42', suitably of carbon refractory, has pumping passages 43' extending diagonally upward and outward as shown. The number of pumping passages 43' is not critical.

The effect of the pumping impeller is to lift molten metal from the bath into contact with the desulphurizing slag. The inlet 43² of the pumping impeller will preferably be located below the slag-metal interface 29, and the outlet 43³ above the slag-metal interface, as shown, to cause distribution of molten metal directly in the slag. The level of the impeller 42' is adjustable as required, for example by using any one of several impellers 42' with different lengths of supporting extension 44.

In any of the forms shown, the desulphurizing slag will be basic in character, the particular ingredients varying with the operating conditions.

*Slags*

The preferable slag will have CaO as its active desulphurizing oxide. As previously explained, other alkaline earths or alkaline oxides can be used. The inventor has found, however, that CaO is very desirable and economical as a desulphurizing agent and it will be used in many of the illustrations, although quite evidently other oxides described could be used in similar manner after making due allowance for known differences in physical and chemical properties of the other oxides.

CaO in the pure state has a high melting point (2570° C.). It is conventional to reduce the melting point of CaO to form readily fusible slags by adding $SiO_2$ and perhaps $Al_2O_3$ and other oxides. Thus, for example, it is possible to form a slag which is free-flowing at 1400° C. having the approximate composition:

| | Percent |
|---|---|
| CaO | 44 |
| MgO | 4 |
| $Al_2O_3$ | 15 |
| $SiO_2$ | 37 |

In such a slag the activity of the lime is reduced by the presence of 37% silica and 15% alumina. Slags of this approximate composition are used as desulphurizing agents in the blast furnace and are capable of building up a 60:1 ratio of the percentage of sulphur in the slag to the percentage of sulphur in the pig iron. It has been found that such a slag can be used in the present invention, especially if the slag and pig iron to be desulphurized are subjected to a diminished pressure, desirably 150 millimeters of mercury or less, thereby causing the sulphur ratio to rise to 100:1 or 200:1 or more depending upon specific conditions.

If ordinary blast furnace slag is used, it may desirably be mixed with say 5% to 10% or even 20% or more by weight of fluorspar and, if desired, up to 20% or more by weight of burned lime or substances high in CaO such as burned dolomite or dolomitic lime. About 2% of lime is the minimum lime addition that would be substantial in effect. The lime content of the slag should not exceed 55%. A typical mixture might consist of 70% blast furnace slag, 10% fluorspar, 20% lime. Such a slag when held in contact with pig iron of high sulphur content (0.16% S) at 1400° C. in a non-oxidizing atmosphere, at normal pressure, reduced the sulphur content of the iron to 0.015% S and the slag increased its sulphur content to 2.66%. A similar slag under an absolute pressure of 35 millimeters of mercury reduced the sulphur content of the iron to 0.001% and the slag contained 2.83% sulphur.

Blast furnace slag mixed with lime and/or fluorspar as just explained, may be employed in any of the forms of the invention disclosed herein whether the deoxidizing agent be carbon at atmospheric pressure or at reduced pressure, or other deoxidizing agent as explained above. Where carbon is the deoxidizing agent, it may in some places be supplied by the carbon dissolved in the pig iron, which normally contains more than 2% of carbon, and in other cases this dissolved carbon may be supplemented by a carbon lining in the reaction vessel and/or by loose carbon added to the reaction vessel.

The $SiO_2$ content of the desulphurizing slag can also be further decreased and slags have been synthesized containing as little as 15% $SiO_2$ or less, as for example using a mixture of 40 parts blast furnace slag, 30 parts fluorspar, 30 parts lime, which slag would contain about 12% $SiO_2$. It has been found that such slags are very advantageous especially where the slag and pig iron under treatment cannot be subjected to low pressures.

A desulphurizing slag having the composition:

| | Percent |
|---|---|
| CaO | 45 |
| $CaF_2$ | 40 |
| $SiO_2$ | 15 | has also been found to be very satisfactory. Such a slag can be readily synthesized by mixing lime and fluorspar of commercial grade, adjusting the silica to the desired percentage by the addition of silica sand, after allowing for the silica present as impurity in the lime and fluorspar. Magnesia present as a normal impurity in a good grade of lime is not objectionable. Alumina present as a small amount of impurity is also not objectionable. Indeed the addition of approximately 5% of alumina seems to be advantageous as it reduces somewhat the melting point of the desulphurizing slag. The above slag flows freely at 1200° C. and this property is very desirable for efficient desulphurization.

Molten pig iron high in sulphur (0.25%) has been subjected to the action of the lime-fluorspar-silica slag above referred to at 1400° C. for one hour at atmospheric pressure in a refractory container composed of carbon in the form of graphite. The slag and molten pig iron were under strong reducing conditions and the desulphurizing vessel was arranged so as to prevent direct contact with the atmosphere or with combustion gases high in oxygen, carbon dioxide or water vapor. Under these conditions the slag picked up as much as 10.79% sulphur, and the pig iron had its sulphur content reduced to 0.03% sulphur, so that there was more than one hundred times as high a percentage of sulphur in the slag as in the pig iron. In other cases in which the pig iron initially contained only about 0.03% sulphur, the sulphur content of the pig iron was reduced to 0.002% sulphur and the slag picked up 0.11% sulphur.

These good desulphurizing results can be still further improved if the pressure on the slag is reduced, for example to 380 millimeters of mercury, or below, and an agitating gas is passed through the bath. It is to be noted, however, that low pressures such as 30 millimeters of mercury are not to be recommended with slags rich in fluorspar unless adequate means are provided to take care of the volatile products which such slags give off at low pressures. The sulphur content of the iron may be reduced to less than one-half, or less than one-quarter, or even less than one-tenth of that in the iron before treatment according to the invention.

A study has been made of the use of soda as a substitute for lime in desulphurizing slags. The desulphurizing action of soda, for example sodium carbonate, on pig iron is well known and this alternative can be used. It is found, however, that pure soda is readily attacked by carbon and silicon in the pig iron at temperatures of 1450° C. or below. The reaction produces carbon monoxide, silica and sodium vapor. The latter is very effective in converting FeS into Na₂S and thus desulphurizing the pig iron. The sodium vapor causes difficulty in the handling of soda slags, and the reaction must be managed in such a way as to limit the formation of volatile soda derivatives in order to avoid excessive loss as fume. It is possible to use slags containing $Na_2O$ combined with $SiO_2$ and/or $Al_2O_3$ and other oxides to overcome volatilization loss incident to sodium carbonate. The revivification of soda slags to remove sulphur and permit reuse presents special difficulties not present in the case of lime slags.

Detailed reference to the steps necessary when soda slags are used is therefore omitted, and the discussion is generally confined to slags containing alkaline earth oxides as the preponderant active constituents. However, the use of slags containing soda or other alkali metal oxides as active desulphurizing ingredients, when used as substitutes for alkaline earth oxides such as lime as active ingredients, is included herein. In some cases desulphurizing slags may be used which employ lime or other alkaline earth oxides and also soda or other alkali metal oxides in combination.

The quantity of oxides of the type $R_xO$ in the initial slag should exceed 30% for best results.

Due to the cheapness and freedom from volatilization, it is preferable to use a lime slag, although such preference is subject to change under varying economic and metallurgical conditions.

In choosing the slag, it is desirable to have one which will be of low viscosity and workable at temperatures of 1400° C., and for this purpose, the slag should preferably be freely fluid at as low as 1200° C. or in some cases at 1300° C.

It is very advantageous to use a slag which shows a high ratio of sulphur concentration in the slag after use to sulphur concentration in the desulphurized or partially desulphurized pig iron.

Much latitude is offered in the choice of slag composition. In general the slag composition and pressure should be chosen so that a ratio of sulphur in the slag to sulphur in the iron should exceed 100:1 and preferably exceed 200:1.

As explained in detail below, it is often advantageous to employ a desulphurizing slag which can be revivified or treated to remove its sulphur so that it can be used over and over again. The lime slags referred to fulfill this requirement. The desulphurizing slag, after it has picked up, for example, 12% sulphur, is revivified by removing sulphur from the slag until, for example, less than 1% sulphur remains. This revivified slag is then used repeatedly to desulphurize further quantities of molten pig iron.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention what I claim as new and desire to secure by Letters Patent is:

1. In apparatus for desulphurizing molten pig iron, a desulphurizing vessel adapted to hold a charge of molten pig iron, desulphurizing slag in the desulphurizing vessel adapted to have contact with the molten pig iron, means for rendering the vessel gas-tight, means for maintaining subatmospheric pressure above the molten pig iron within the vessel and means for introducing beneath the lower level of the slag a stream of non-contaminating gas and at a temperature substantially below that of the pig iron.

2. In apparatus for desulphurizing molten pig iron, a desulphurizing vessel adapted to hold a charge of molten pig iron in a closed space free from contamination of oxidizing substances, means for maintaining subatmospheric pressure within the vessel, desulphurizing slag within the desulphurizing vessel and adapted to have contact with the molten pig iron at a slag-pig-iron interface, and gaseous means for projecting streams of molten metal locally into the slag at the slag-pig-iron interface as distinguished from bodily stirring, the stirring being substantially concentrated in the region adjacent the interface.

3. In apparatus for desulphurizing molten pig iron, a desulphurizing vessel adapted to hold a charge of molten pig iron, a desulphurizing slag in the desulphurizing vessel and adapted to have contact with the molten pig iron at a slag-pig-iron interface, means for maintaining subatmospheric pressure in the vessel and gaseous means operating beneath the surface of the iron for projecting streams of molten metal locally upwardly into the slag at the slag-pig-iron interface as distinguished from bodily stirring.

4. In desulphurizing apparatus, a vessel adapted to hold a charge of molten metal, means for closing the vessel to exclude the atmosphere, means for maintaining subatmospheric pressure within the vessel, an electrode extending beneath the surface of the molten metal from the wall of the vessel and a tuyère in the electrode for introducing noncontaminating gas into the molten metal.

5. In desulphurizing apparatus, a desulphurizing vessel adapted to hold a charge of molten pig iron, desulphurizing slag in the desulphurizing vessel adapted to have contact with the molten pig iron at a slag-pig-iron interface, a carbon refractory lining within the vessel, gaseous means operating within the vessel and beneath the surface of the iron for agitating the pig iron locally adjacent the slag-pig-iron interface as distinguished from bodily stirring, and means for maintaining subatmospheric pressure within the vessel.

6. In apparatus for desulphurizing molten pig iron, a desulphurizing vessel having charging and pouring openings and adapted to hold a charge of molten pig iron, desulphurizing slag in the vessel adapted to have contact with the molten pig iron, removable means for rendering the openings into the vessel gas-tight, means for maintaining subatmospheric pressure within the vessel, an electrode extending below the surface of the molten metal from the wall of the vessel and a tuyère in the electrode for introducing non-contaminating gas into the molten metal.

RUSSELL P. HEUER.